Patented Apr. 8, 1930

1,753,661

UNITED STATES PATENT OFFICE

WALTER N. McCONKEY, OF LIMA, OHIO

WATER SOFTENER AND METHOD OF PREPARING

No Drawing.   Application filed September 24, 1927. Serial No. 221,862.

This invention relates to an improved method of as well as to a new material for treating water and can be applied to water intended for a great variety of uses, such as boilers, ice plants, drinking, laundries, and many other purposes both domestic and industrial. It also involves water treatment fed into boilers direct with and without soda ash and caustic soda and can be used in locomotive boilers and boat boilers. Furthermore, it contemplates treatment by either the hot or the cold process with lime and soda ash both continuous or intermittent. It also involves the provision of a method which will aid certain chemical processes, as will appear below.

I have found, for example, that aluminum oxide when properly treated with certain chemicals and then allowed to come in contact with water forms a heavy flocculent precipitate which tends to carry down out of the water all the suspended material and organic matter, and, at the same time, due to the chemicals with which it was previously treated, it will soften the water, throwing down the temporary and permanent hardness.

But, although the characteristics of aluminum oxide make it extremely valuable for softening water, it has not heretofore been possible to get it into a satisfactory liquid form for use as a water softener, and the principal object of my invention is to change aluminum oxide into aluminum hydroxide and, at the same time, hold it in suspension in a water solution.

I accomplish the foregoing by adding from about 1 to about 5% of tri-basic sodium phosphate ($Na_3PO_4.12H_2O$) which amount will successfully hold the alumina in a water solution in the form of aluminum hydroxide. The tri-basic sodium phosphate reacts with the temporary hardness in the water to form the insoluble tertiary orthophosphate of calcium ($Ca_3(PO_4)_2$) or magnesium and soda ash. This will operate to soften the water because the soda ash from the above reaction reacts in turn with the permanent hardness to throw it down as the insoluble calcium or magnesium carbonate.

As a source of aluminum hydroxide I do not need to be confined to the use of aluminum oxide as commercial soda or potassium alum, for example, contains approximately 17% aluminum oxide and commercial aluminum chloride contains about 21%.

In preparing my improved material I prefer to proceed as follows: To a retort containing approximately 65% water with 20% of caustic soda, I add 10% of aluminum oxide or an amount of soda or potash alum or aluminum chloride which will result in a product which is approximately 10% aluminum hydroxide, for I have found that this amount works the best for coagulating purposes. The mixture is heated with agitation until all the aluminum is in the form of aluminum hydroxide. Then from 5 to 10% of tri-sodium phosphate is added which, I have found, tends to hold the aluminum hydroxide in colloidal suspension.

At this point it is advantageous to add approximately 1 to 2% of some organic material, such as glycerine or castor oil. Such heavy viscous substances help to keep the aluminum hydroxide in colloidal suspension.

When treating water internally in a boiler, I have found in practice that the addition of one to two percent of soda alum to my material will prevent caustic embrittlement. This is due to the fact that when the soda alum comes in contact with the alkalies, such as caustic soda, sodium sulphate is formed as one of the products, and by keeping the sodium sulphate to the unreacted soda ash content in the boiler in the ratio of two parts free sodium sulphate to one part free soda ash, caustic embrittlement is prevented.

If desired, barium hydroxide may be used in preparing my material either with or without the caustic soda. I have found that ten percent of barium hydroxide when heated in a retort with aluminum oxide of approximately ten percent that the aluminum oxide will go into a colloidal suspension being held by the barium hydroxide. Barium hydroxide will react with the temporary hardness of the water to form calcium or magnesium carbonates, barium carbonate and water, thus the barium hydroxide not only holds the aluminum hydroxide in suspension but also is a water softener.

I claim:—

1. As a new product, a liquid water softener containing aluminum hydroxide held in suspension in a water solution.

2. As a new product, a liquid water softener containing aluminum hydroxide, caustic soda, and tri-sodium phosphate.

3. As a new product, a liquid water softener containing aluminum hydroxide of approximately 5% held in suspension by the addition of from 5 to 10% of tri-basic sodium phosphate.

4. As a new product, a liquid water softener containing aluminum hydroxide, caustic soda, tri-sodium phosphate, and 1 to 2% of soda alum.

5. As a new product, a liquid water softener containing aluminum hydroxide held in colloidal suspension by the addition of 1 to 2% of an organic liquid such as glycerine or castor oil.

6. As a new product, a liquid water softener containing aluminum hydroxide, caustic sida, 5 to 10% tri-sodium phosphate, 1 to 2% soda alum, and 1 to 2% of an organic liquid such as glycerine or castor oil.

7. In the method of preparing aluminum hydroxide for use as a water softener, the step which consists in adding tri-sodium phosphate to a solution of aluminum oxide in caustic soda.

8. In the method of preparing aluminum hydroxide for use as a water softener, the steps which consist in adding tri-sodium phosphate to a solution of aluminum oxide in caustic soda and then adding an organic liquid to the mixture.

9. The herein described method of preparing aluminum hydroxide for use as a water softener, which comprises adding the oxide to a solution of caustic soda, heating and agitating the mixture until all the aluminum is in the form of aluminum hydroxide, and then adding tri-sodium phosphate to the mixture.

10. The herein described method of preparing aluminum hydroxide for use as a water softener, which comprises adding the oxide to a solution of caustic soda, heating and agitating the mixture until all the aluminum is in the form of aluminum hydroxide, then adding tri-sodium phosphate to the mixture, and finally in adding an organic liquid, such as glycerine or castor oil.

In testimony whereof I have hereunto signed my name.

WALTER N. McCONKEY.